1. 0132615221 is a whole number.
2. 0151720081 is an abstract number.
3. 0800.6132 is a decimal.
4. 02220072 is an even number.
5. $42\tfrac{10}{32}$ is a mixed number.
6. Can you express in words .000142?
7. Can you find all the prime factors of 0200?

Time — 10 min.

| Add | Subtract | Multiply | Divide |
|---|---|---|---|
| 1. 3984 | 2. 36005 | 3. 323 | 4. 34)81906 |
| 4 | 19096 | .25 | |
| 296 | | | |
| 307 | | 5. $7\tfrac{3}{4} \times \tfrac{4}{3} =$ | 6. 4)1.064 |
| 6785 | | | |
| 4397 | | | |

7. How many pencils can you buy for 50¢ at the rate of 2 for 5 cents?

Inventor
Frank P. Gleason
By
Attorney

Patented June 17, 1924.                                        1,498,448

UNITED STATES PATENT OFFICE.

FRANK P. GLEASON, OF NEWARK, NEW JERSEY.

EASY-KEYED NUMBER TEST.

Application filed October 2, 1920. Serial No. 414,354.

*To all whom it may concern:*

Be it known that I, FRANK P. GLEASON, a citizen of the United States, residing at Newark, in the county of Essex and State of New Jersey, have invented certain new and useful Improvements in Easy-Keyed Number Tests, of which the following is a specification.

The present invention relates to a method of and means for formulating keys to the answers of mathematical problems and consists in the arrangements and steps of procedure hereinafter described and particularly set forth in the accompanying claim.

The purpose of the invention is to provide an arbitrary arrangement of numeral characters or expressions from which the correct answers to problems may be derived by an easy and mental process, but which keys in themselves do not indicate or suggest such answers to those who are working the problems.

Another purpose of the invention is to provide a card or sets of cards, each of which contains the problems to be solved and their accompanying keys, to the end of saving the time of the teacher and as an aid in checking results quickly; and conversely to train pupils to calculate rapidly and accurately.

The invention is shown by way of illustration in the accompanying drawing.

It is proposed that there shall be as many as fifty (50) such cards in a set, or fewer or more, with from four (4) to eight (8) problems on each card. Beginning with the second school year, one set of cards is allotted for each half year, and in this manner continuing up through the eighth year. The plan herein proposed may also be used with advantage in the high school.

The several cards of the system include problems in whole numbers, common fractions, decimals, fractions and problems. On each card are printed not only the problems for solution but also a key statement for checking each problem. No problem is repeated in each set for each half year, thus preventing any possibility of pupils copying.

While the plan or principle of keying is the same on each card, the key, printed on each card, for the purpose of keying the problems on the card is different.

A sample of a fifth year card, as shown in the accompanying drawing is the following. The upper portion represents the key and on the lower part are the problems to be solved.

1. 0132615221 is a whole number.
2. 0151720081 is an abstract number.
3. 0800.6132 is a decimal.
4. 02220072 is an even number.
5. $42\tfrac{10}{32}$ is a mixed number.
6. Can you express in words .000142?
7. Can you find all the prime factors of 0200?

Time—10 min.

| Add | Subtract | Multiply | Divide |
|---|---|---|---|
| 1. | 2. | 3. | 4. |
| 3984 | 36005 | 323 | 34 ⟌ 81906 |
| 4 | 19096 | .25 | |
| 296 | | | |
| 307 | | 5. | 6. |
| 6785 | | $7\tfrac{3}{4} \times \tfrac{4}{5} =$ | 4 ⟌ .064 |
| 4397 | | | |

7. How many pencils can you buy for 50c at the rate of 2 for 5 cents?

Each problem on the number card has its key expressed in a statement with a view to concealing it from, and also as a matter of instruction to, the pupil. The number of the key statement corresponds to the number of the problem on the number card. Beginning at the left in each case, the sum of the couplets taken in order will give a number which is the correct answer to the problem whose number on the card corresponds to the number of the key statement of the card.

The processes of subtraction, multiplication, or division may be used with equal facility in securing the answer, by simply changing the key figures. The sum, difference, product or quotient of each pair of couplets in each case is a whole number.

From the card submitted No. 1 key statement is: 0132615221 is a whole number.

The answer to problem No. 1 on card No. 1 is: By addition 0132615221 is a whole number.

Beginning at the left and adding each pair of couplets the result is 15773, the answer. By subtraction 1216291814 is a whole number.

Beginning at the left and subtracting each pair of couplets the result is 15773, the answer. By multiplication 1151711713 is a whole number.

Beginning at the left and multiplying each pair of couplets the result is 15773, the answer. By division 1115171713 is a whole number.

Beginning at the left and dividing each pair of couplets the result is 15773, the answer.

In case there is a mixed number in the key statement as No. 5 on the card submitted $-42\frac{10}{32}$, add the couplets in the whole number and the couplets in the numerator and denominator of the fraction; as, $$4+2=\frac{1+0=1}{3+2=5}=6\frac{1}{5} \text{ equals the answer.}$$

While the method of keying on the sample card herein shown is by adding couplets, I reserve the right to either subtract couplets, multiply couplets, or divide couplets. I, also, reserve the right to add couplets in all addition problems, subtract couplets in all subtraction problems, multiply couplets in all multiplication problems and divide couplets in all division problems.

Having thus described my invention, what I claim as new and desire to protect by United States Letters Patent is:

An article of manufacture comprising a card having thereon indicia for a problem in mathematics, and supplemental indicia of concealed significance supplying a derived key to the answer of such problem, said derived key consisting in arbitrarily selecting a numerical expression whose digit places number twice the number of digit places in the answer, substantially as set forth.

In testimony whereof I affix my signature.

FRANK P. GLEASON.